(12) United States Patent
Onodera et al.

(10) Patent No.: US 8,001,774 B2
(45) Date of Patent: Aug. 23, 2011

(54) CONTROL METHOD OF EXHAUST GAS PURIFICATION SYSTEM AND EXHAUST GAS PURIFICATION SYSTEM

(75) Inventors: Takao Onodera, Fujisawa (JP); Takashi Haseyama, Fujisawa (JP); Yoshinobu Watanabe, Fujisawa (JP); Takuro Iwashita, Fujisawa (JP); Kenji Hagio, Fujisawa (JP); Tatsuo Mashiko, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 431 days.

(21) Appl. No.: 12/223,389

(22) PCT Filed: Jan. 10, 2007

(86) PCT No.: PCT/JP2007/050158
§ 371 (c)(1),
(2), (4) Date: Jul. 30, 2008

(87) PCT Pub. No.: WO2007/088714
PCT Pub. Date: Aug. 9, 2007

(65) Prior Publication Data
US 2009/0007547 A1    Jan. 8, 2009

(30) Foreign Application Priority Data

Feb. 1, 2006    (JP) .................................. 2006-024181

(51) Int. Cl.
*F01N 3/00*    (2006.01)
*F01N 1/00*    (2006.01)

(52) U.S. Cl. ................ 60/295; 60/274; 60/287; 60/292; 60/297; 60/324

(58) Field of Classification Search ..................... 60/273, 60/274, 285, 287, 292, 295, 297, 299, 324
See application file for complete search history.

(56) References Cited

U.S. PATENT DOCUMENTS
5,934,072 A    8/1999    Hirota et al.
(Continued)

FOREIGN PATENT DOCUMENTS
CN    1676889    10/2005
(Continued)

OTHER PUBLICATIONS

Hashimoto et al, English machine translation of JP 2005-315190 A, Nov. 10, 2005.*

(Continued)

*Primary Examiner* — Thomas Denion
*Assistant Examiner* — Audrey Klasterka
(74) *Attorney, Agent, or Firm* — Staas & Halsey LLP

(57) ABSTRACT

At regeneration control while a vehicle mounting an internal combustion engine (10) is parked, both an exhaust throttle valve (13) and an exhaust brake valve (18) are used and if a catalyst temperature index temperature (Tg2) is lower than a predetermined first determining temperature (Tc1), first exhaust gas temperature rise control is conducted that the exhaust brake valve (18) is set to a fully closed side and multiple injection is carried out in in-cylinder fuel injection control, while if a catalyst temperature index temperature (Tg2) is equal to the predetermined first determining temperature (Tc1) or above, second exhaust gas temperature rise control is conducted that the exhaust brake valve (18) is set to an open side, the exhaust throttle valve (13) is set to the fully closed side, and post injection is carried out in the in-cylinder fuel injection control. By this arrangement, while temperature rise efficiency of an exhaust gas flowing into a DPF (12) is enhanced, forced regeneration is carried out efficiently in a short time with avoiding overheat or abnormal combustion at the regeneration control of the DPF (12) while the vehicle is parked.

6 Claims, 3 Drawing Sheets

U.S. PATENT DOCUMENTS

| | | |
|---|---|---|
| 7,104,050 B2 | 9/2006 | Sato et al. |
| 7,316,107 B2 | 1/2008 | Aratsuka et al. |
| 2005/0044845 A1 | 3/2005 | Onodera et al. |
| 2005/0217251 A1* | 10/2005 | Sato et al. ............ 60/295 |
| 2005/0217252 A1 | 10/2005 | Sato et al. |
| 2005/0217255 A1 | 10/2005 | Aratsuka et al. |
| 2006/0201144 A1 | 9/2006 | Gabe et al. |

FOREIGN PATENT DOCUMENTS

| | | |
|---|---|---|
| CN | 1676890 | 10/2005 |
| EP | 861973 | 2/1998 |
| EP | 1 582 708 | 10/2005 |
| EP | 1 582 720 | 10/2005 |
| JP | 4-8718 | 1/1992 |
| JP | 10-238336 | 9/1998 |
| JP | 2003-90209 | 3/2003 |
| JP | 2003-155914 | 5/2003 |
| JP | 2004-353529 | 12/2004 |
| JP | 2005-76604 | 3/2005 |
| JP | 2005-307746 | 11/2005 |
| JP | 2005-315190 | 11/2005 |
| WO | WO 2004/106703 | 12/2004 |

OTHER PUBLICATIONS

International Search Report mailed Apr. 24, 2007 (International Application No. PCT/JP2007/050158, Filed Jan. 10, 2007).

Patent Abstracts of Japan, Publication No. 2005-076604, Published Mar. 24, 2005.

Patent Abstracts of Japan, Publication No. 2004-353529, Published Dec. 16, 2004.

European Communication dated May 16, 2011 in Appln. No. 07706505.0.

* cited by examiner

CONTROL METHOD OF EXHAUST GAS PURIFICATION SYSTEM AND EXHAUST GAS PURIFICATION SYSTEM

CROSS REFERENCE TO RELATED APPLICATIONS

This application claims the benefit under 35 U.S.C. §371, of PCT International Application Number PCT/JP2007/050158, filed Jan. 10, 2007 and Japanese Application No. 2006-024181 filed Feb. 1, 2006, the contents of which are incorporated herein by reference.

BACKGROUND OF THE INVENTION

1. Field of the Invention

The present invention relates to a control method of an exhaust gas purification system and an exhaust gas purification system for conducting exhaust gas temperature rise control accompanied by operation of an exhaust brake valve and an exhaust throttle valve in order to recover purification capacity of a diesel particulate filter device to purify components in an exhaust gas of an internal combustion engine such as a diesel engine.

2. Description of the Related Art

Regulations on an amount of the particulate matter (PM: particulate matter: Hereinafter referred to as PM) exhausted from a diesel engine as well as NOx, CO, HC and the like have been tightened year by year. A technology has been developed that the PM is collected in a filter called a diesel particulate filter (DPF: Diesel Particulate Filter: Hereinafter referred to as DPF) to thereby reduce the PM amount exhausted to the outside. A continuous regeneration type DPF device carrying a catalyst is among them.

In this continuous regeneration type DPF device, when an exhaust gas temperature is approximately 350° C. or above, the PM collected by the filter is continuously burned and purified, and the filter is self-regenerated. However, if the exhaust temperature is low, for example, if a low exhaust temperature state such as in an idling operation, a low-load/low-speed operation, or the like of an internal combustion engine continues or the like, a temperature of the exhaust gas is low, and the temperature of the catalyst is lowered and the catalyst is not activated. Thus, oxidation reaction is not promoted, and oxidation of PM to regenerate a filter becomes difficult. Therefore, accumulation of PM on the filter continues, and clogging of the filter progresses. Thus, there emerges a problem of exhaust pressure rise caused by the clogging of the filter.

One of methods to solve such a problem is a regeneration control for forcedly burning and removing the collected PM by forcedly raising the temperature of exhaust gas when an amount of clogging of the filter exceeds a predetermined one. In this regeneration control, the exhaust gas temperature rise control is conducted to raise a temperature of the exhaust gas flowing into the filter to the temperature or above at which the PM collected by the filter is burned. By this arrangement, the filter temperature is raised so as to burn and remove the PM and the filter is regenerated.

This kind of exhaust gas temperature rise control includes methods of fuel injection in a cylinder (in-cylinder) such as multiple injection (multiple-stage delayed injection), post injection (after-injection). The multiple injection is a delayed multiple-stage injection in which the fuel is injected into the cylinder in many stages. By this multiple injection, a fuel amount simply burned in the cylinder without generating torque is increased, and the temperature of the exhaust gas exhausted from the cylinder, that is, the temperature of the exhaust gas flowing into an oxidation catalyst device can be raised to a catalyst activation temperature of the oxidation catalyst or above.

The post injection is an auxiliary injection injecting at timing further delayed from the multiple injection injected after main injection in the in-cylinder injection. By this post injection, HC (hydrocarbon) is increased in the exhaust gas exhausted from the cylinder and the HC is oxidized by the oxidation catalyst. By this oxidation, the temperature of the exhaust gas on the downstream of the oxidation catalyst device can be raised.

On the other hand, in view of a measure against oil dilution that an unburned fuel is mixed with engine oil (lubrication oil) by the post injection and dilutes the engine oil, there is a control of forced regeneration during idling when the vehicle is parked and when an operation state is stable. In this control, when the PM is accumulated in a predetermined amount in the filter device, need of regeneration control of the filter device is notified to an operator (driver) by a warning means such as an alarm lamp. When the driver having received the notification stops the vehicle and presses a manual regeneration button, a manual regeneration mode is started and the forced regeneration is carried out.

In this system, the oxidation catalyst device is installed on a front (upstream side) of the filter device and the HC supplied into the exhaust gas by the post injection is oxidized through this oxidation catalyst device. By this oxidation, the temperature of the exhaust gas at an inlet of the filter device is raised so as to carry out the forced regeneration.

In this exhaust gas temperature rise, when the temperature of the exhaust gas is low as in the low-speed/low-load operating state, the multiple injection is carried out in the first place so as to raise the exhaust gas temperature of the oxidation catalyst device to a catalyst activation temperature of the oxidation catalyst or above. After the exhaust gas temperature of the oxidation catalyst device has been raised to the catalyst activation temperature, the post injection is carried out by the fuel injection control while the exhaust gas temperature is kept equal to the catalyst activation temperature or above and HC is supplied to the oxidation catalyst device. This HG is oxidized by the oxidation catalyst and generates heat, and thus the exhaust gas flows into the filter device with the temperature further raised. By this high-temperature exhaust gas, the PM accumulated in the filter device is burned and removed.

At this regeneration, as described in Japanese Patent Application Kokai Publication No. 2005-76604 and Japanese Patent Application Kokai Publication No. 2004-353529, for example, the following forced regeneration is carried out. If the temperature of the exhaust gas flowing into the oxidation catalyst device is equal to the oxidation catalyst activation temperature or below, the temperature is kept by throttling an exhaust throttle valve (exhaust throttle) and the multiple injection is carried out at the same time. By this multiple injection, the temperature of the exhaust gas flowing into the oxidation catalyst device is raised to the oxidation catalyst activation temperature or above. After that, the forced regeneration is carried out by further carrying out the post injection or by carrying out the exhaust throttle, the multiple injection and the post injection at the same time.

In the exhaust temperature rise control using the exhaust throttle valve as above, if the exhaust throttle valve is set to the fully closed side in the regeneration control when a vehicle is parked, an exhaust passage is narrowed. Thus, resistance against the exhaust gas flow is increased, the exhaust pressure is raised, and an engine load (pumping loss) of an engine is increased. The increase of the engine load is one of factors that reduce an engine speed. However, during an idling operation, control is conducted so that an idling engine speed is maintained. Thus, a fuel injection amount into a cylinder is increased, and more amount of heat is generated. Accordingly, an in-cylinder temperature and a temperature of the exhaust gas are raised.

On the other hand, from the viewpoint of measures against noise, slight opening is provided at the exhaust throttle valve even in the fully closed state, and heat escapes from this opening, that is, a gap even at the fully closed time. Thus, if the temperature of the exhaust gas is to be raised to a temperature required for the forced regeneration, it is necessary to further generate heat on the engine side for the escaping heat. As a result, the engine might be overheated.

Then, an exhaust brake valve (exhaust brake) with valve opening (opening area) further smaller than the exhaust throttle valve at fully closed may be used to raise the exhaust gas temperature. However, in this case, if the post injection is carried out with the exhaust brake valve fully closed, the opening area of the exhaust passage becomes too small. Thus, though the exhaust gas temperature is rapidly raised, the in-cylinder temperature is also raised too much. As a result, when the in-cylinder temperature is low, ignition is not realized and the fuel by the post injection flowing out to the exhaust passage side is ignited and burned in the cylinder, which causes abnormal combustion inside the cylinder. Since the post injection is carried out considerably after a TDC (top dead center), burned gas flows into the exhaust. Thus, the exhaust gas temperature becomes abnormally high, which damages the oxidation catalyst and DPF. Therefore, there is a problem that the temperature of the exhaust gas can not be raised by the post injection with the exhaust throttle by the exhaust brake valve.

Patent Document 1: Japanese Patent Application Kokai Publication No. 2005 - 76604

Patent Document 2: Japanese Patent Application Kokai Publication No. 2004 - 353529

DISCLOSURE OF THE INVENTION

Problems to be Solved by the Invention

SUMMARY OF THE INVENTION

The present invention has an object to provide a control method of an exhaust gas purification system and an exhaust gas purification system provided with an oxidation catalyst and a DPF device for purifying PM in an exhaust gas in an internal combustion engine such as a diesel engine, in which forced regeneration can be realized efficiently in a short time, avoiding overheat or abnormal combustion, at regeneration of the DPF while a vehicle is parked and particularly at manual regeneration while a temperature rise efficiency of an exhaust gas flowing into the DPF is enhanced.

Means for Solving the Problem

In order to achieve the above object, a control method of an exhaust gas purification system of the present invention comprising an exhaust gas purification device having an oxidation catalyst device carrying an oxidation catalyst and a diesel particulate filter device arranged in order from an upstream side or an exhaust gas purification device having a diesel particulate filter device carrying an oxidation catalyst arranged, an index temperature detecting means for detecting a catalyst temperature index temperature indicating a temperature of the oxidation catalyst, an exhaust throttle valve, and an exhaust brake valve in an exhaust passage of an internal combustion engine and also comprising a controller for carrying out regeneration control based on a detection result of the index temperature detecting means in order to recover purification capacity of the diesel particulate filter device, is characterized in that at the regeneration control while a vehicle with the internal combustion engine mounted is parked, both the exhaust throttle valve and the exhaust brake valve are used.

Additionally, the above control method of the exhaust gas purification system is characterized in that at regeneration control while the vehicle with the internal combustion engine mounted is parked, if the catalyst temperature index temperature is lower than a predetermined first determining temperature, first exhaust gas temperature rise control is conducted that the exhaust brake valve is set to a fully closed side and multiple injection is carried out in in-cylinder fuel injection control, while if the catalyst temperature index temperature is equal to the predetermined first determining temperature or above, second exhaust gas temperature rise control is conducted that the exhaust brake valve is set to an open side, the exhaust throttle valve is set to the fully closed side, and post injection is carried out in the in-cylinder fuel injection control.

Additionally, the control method of the exhaust gas purification system is characterized in that at regeneration control while the vehicle with the internal combustion engine mounted is parked, if a filter temperature index temperature indicating a temperature of the diesel particulate filter device is higher than a predetermined second determining temperature higher than the predetermined first determining temperature, the exhaust brake valve is set to the open side, the exhaust throttle valve is set to the fully closed side, and regeneration temperature maintaining control by the multiple injection is conducted without carrying out the post injection in the in-cylinder fuel injection control.

Moreover, the control method of the exhaust gas purification system is characterized in that the regeneration control while the vehicle with the internal combustion engine mounted is parked includes manual regeneration control.

The temperature of the oxidation catalyst (bed temperature) is preferably used as a temperature for determination, but since directly measuring it is difficult, the catalyst temperature index temperature indicating the temperature of the oxidation catalyst is used instead of it. As the catalyst temperature index temperature, a temperature of an exhaust gas flowing into the oxidation catalyst, a temperature of the exhaust gas flowing out of the oxidation catalyst, or a temperature derived from these both temperatures (average temperature or the like, for example) can be used. Moreover, using the both temperatures, respectively, determination on the both temperatures can be used for logic of AND or OR. If the temperature of the oxidation catalyst can be measured, the temperature of the oxidation catalyst shall be also included in the catalyst temperature index temperature herein. As the predetermined first determining temperature, an oxidation catalyst activation temperature of the oxidation catalyst device (approximately 200 to 250° C., for example) is used.

The temperature of the DPF device is preferably used as a temperature for determination, but since directly measuring it is difficult, the filter temperature index temperature indicating the temperature of the diesel particulate filter device (DPF device) is used instead of it. As the filter temperature index temperature, a temperature of the exhaust gas flowing into the DPF device, a temperature of the exhaust gas flowing out of the DPF device, or a temperature derived from these both temperatures (average temperature or the like, for example) can be used. Moreover, using the both temperatures, respectively, determination on the both temperatures can be used for logic of AND or OR. If the temperature of the DPF device can be measured, the temperature of the DPF device shall be also included in the filter temperature index temperature. As the predetermined second determining temperature, a temperature rise target temperature of the exhaust gas (approximately 500 to 600° C., for example) is used.

The exhaust throttle valve is a valve used for throttling a flow rate of the exhaust gas. On the other hand, the exhaust brake valve is a valve playing a role of giving resistance to rotation of the engine as an auxiliary brake by giving a large resistance to the exhaust gas flow and raising an exhaust pressure of the engine.

The exhaust throttle valve and the exhaust brake valve usually conduct binary control of fully open or fully closed. However, with these both valves, valve opening (opening rate: opening area) at fully closed is different and the fully closed exhaust throttle valve has valve opening larger than that of the fully closed exhaust brake valve, and also, the exhaust gas passes through more easily.

In the present invention, when the exhaust gas temperature is low, the opening area of the exhaust passage is made small using the exhaust brake valve when only the multiple injection is carried out but the post injection is not. By this arrangement, a temperature rise efficiency of the exhaust gas is enhanced and rapid temperature rise of the exhaust gas is promoted. When the exhaust gas temperature has been raised and the post injection is to be carried out, switching is made to the use of the exhaust throttle valve so as to slightly increase the opening area of the exhaust passage. By this arrangement, while the temperature rise efficiency of the exhaust gas is maintained to some extent, abnormal combustion at the post injection is prevented. Moreover, when the exhaust gas temperature has been raised, the post injection is stopped so as to restrict the exhaust gas temperature rise. By this arrangement, the abnormal combustion in the DPF is avoided and melting damage of the DPF is prevented. Therefore, at regeneration of the DPF while the vehicle is parked, particularly at the manual regeneration, forced regeneration can be realized efficiently in a short time avoiding overheat or abnormal combustion while the temperature rise efficiency of the exhaust gas flowing into the DPF is enhanced.

That is, in the first exhaust gas temperature rise control while the catalyst temperature index temperature is lower than the predetermined first determining temperature, the exhaust brake valve with a smaller opening area is used so as to improve the temperature rise efficiency of the exhaust gas. After the catalyst temperature index temperature has been raised to the first determining temperature or above, the exhaust throttle valve with a larger opening area is used so that the fuel of the post injection is not burned in the cylinder. By this arrangement, abnormal combustion in the cylinder is prevented, and overheat of the engine is avoided.

In many cases, the regeneration controls while the vehicle with the internal combustion engine mounted is parked are manual regeneration controls which are started upon input of regeneration start instruction from a driver prompted for regeneration start of the DPF device by the warning means such as a flashing lamp when the clogged state of the DPF device exceeds a predetermined state. However, the regeneration controls while the vehicle is parked can also occur when the vehicle is stopped in automatic regeneration during running or the like other than the manual regeneration control.

In order to achieve the above object, an exhaust gas purification system of the present invention comprising an exhaust gas purification device having an oxidation catalyst device carrying an oxidation catalyst and a diesel particulate filter device arranged in order from an upstream side or an exhaust gas purification device having a diesel particulate filter device carrying an oxidation catalyst arranged, an index temperature detecting means for detecting a catalyst temperature index temperature indicating a temperature of the oxidation catalyst, an exhaust throttle valve, and an exhaust brake valve in an exhaust passage of an internal combustion engine, and also comprising a controller for carrying out regeneration control based on a detection result of the index temperature detecting means in order to recover purification capacity of the diesel particulate filter device, wherein at the regeneration control while a vehicle with the internal combustion engine mounted is parked, the controller is configured to conduct control using both the exhaust throttle valve and the exhaust brake valve.

Additionally, in the above exhaust gas purification system, the controller is configured that at regeneration control while the vehicle with the internal combustion engine mounted is parked, if the catalyst temperature index temperature is lower than a predetermined first determining temperature, first exhaust gas temperature rise control is conducted that the exhaust brake valve is set to a fully closed side and multiple injection is carried out in in-cylinder fuel injection control, while if the catalyst temperature index temperature is equal to the predetermined first determining temperature or above, second exhaust gas temperature rise control is conducted that the exhaust brake valve is set to an open side, the exhaust throttle valve is set to the fully closed side, and post injection is carried out in the in-cylinder fuel injection control.

Additionally, in the exhaust gas purification system, the controller is configured that at regeneration control while the vehicle with the internal combustion engine mounted is parked, if a filter temperature index temperature indicating a temperature of the diesel particulate filter device is higher than a predetermined second determining temperature higher than the predetermined first determining temperature, the exhaust brake valve is set to the open side, the exhaust throttle valve is set to the fully closed side, and regeneration temperature maintaining control by the multiple injection is conducted without carrying out the post injection in the in-cylinder fuel injection control.

The exhaust gas purification system is also configured that the regeneration control while the vehicle with the internal combustion engine mounted is parked includes the manual regeneration control.

By the above configuration, the exhaust gas purification system that can conduct the above control method of the exhaust gas purification system can be provided, and the similar working effect can be exerted.

ADVANTAGES OF THE INVENTION

According to the control method of the exhaust gas purification system and the exhaust gas purification system of the present invention, in the exhaust gas purification system provided with the exhaust gas purification device having the oxidation catalyst device and the DPF device for purifying PM in the exhaust gas in the exhaust passage of the internal combustion engine such as the diesel engine, the controller conducts control using both the exhaust throttle valve and the exhaust brake valve at the regeneration control while the vehicle is parked. Thus, when the exhaust gas temperature is low, temperature rise property is ensured and the exhaust gas temperature rise efficiency can be enhanced through using the exhaust brake valve. When the exhaust gas temperature becomes higher, excessive rise of the exhaust gas temperature can be restricted through using the exhaust throttle valve even if the post injection is carried out. Therefore, efficient forced regeneration is enabled while overheat is avoided.

DETAILED DESCRIPTION OF THE INVENTION

Figure 1:
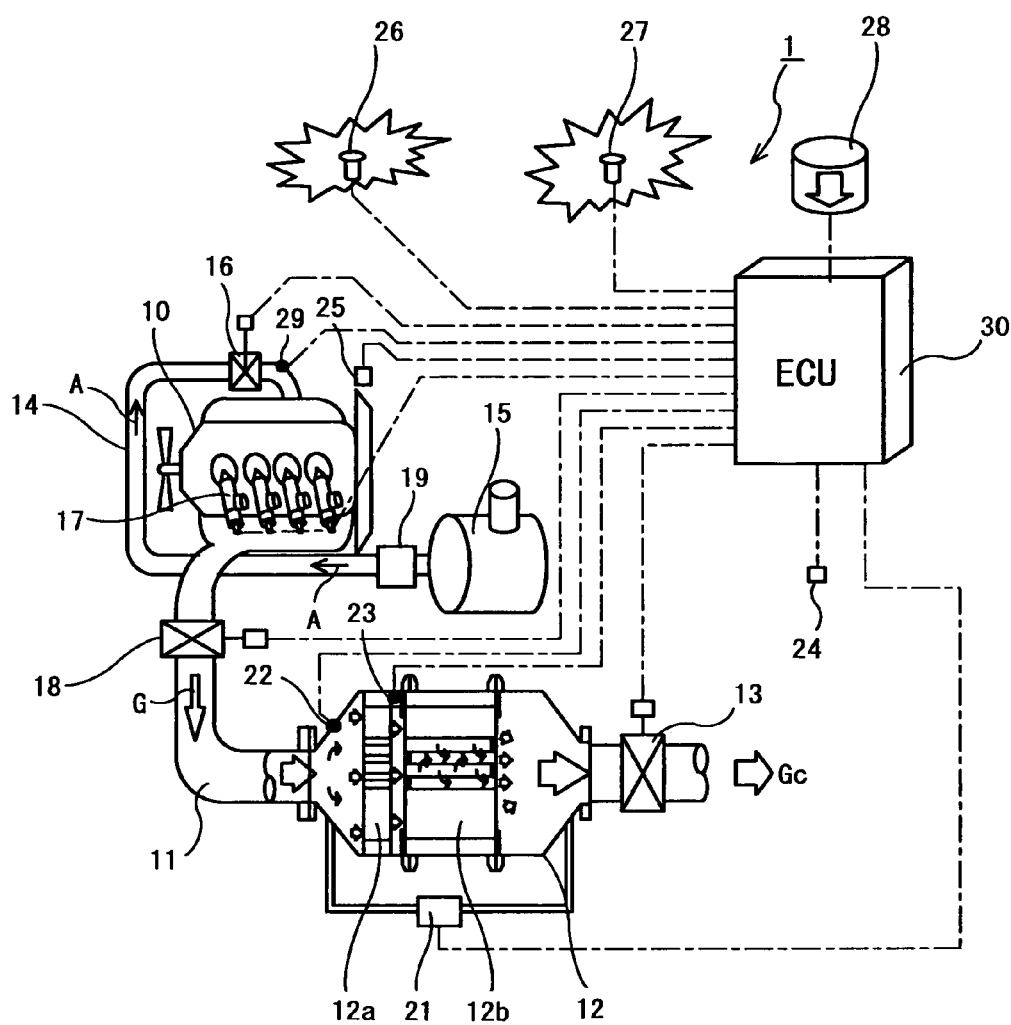
FIG. 1 is a system block diagram of an exhaust gas purification system according to an embodiment of the present invention.

A control method of an exhaust gas purification system and the exhaust gas purification system according to the present invention will be described below referring to the drawings.

FIG. 1 shows a configuration of an exhaust gas purification system 1 according to this embodiment. The exhaust gas purification system 1 comprises an exhaust gas purification device 12 in an exhaust passage 11 of a diesel engine (internal combustion engine) 10. The exhaust gas purification device 12 is one of continuous regeneration type DPF (diesel particulate filter) devices and is configured to comprise an oxidation catalyst device 12a on an upstream side and a filter device 12b with catalyst on a downstream side. An exhaust brake valve (exhaust brake) 18 is provided on the upstream side of the exhaust gas purification device 12 and an exhaust throttle valve (exhaust throttle) 13 on the downstream side. A positional relation between the exhaust brake valve 18 and the exhaust throttle valve 13 is not particularly limited and either of them can be the front or the rear. The positional relation with the exhaust gas purification device 12 is not particularly limited, either. However, when considering an effect of the exhaust brake, it is preferable that the exhaust brake valve is arranged on the upstream side and the exhaust throttle valve on the downstream side.

The oxidation catalyst device 12a is formed by having an oxidation catalyst such as platinum (Pt) carried by a carrier such as a porous ceramic honeycomb structure. The filter device 12b with catalyst is formed by a monolith-honeycomb wall-flow type filter in which an inlet and an outlet of a channel of a porous ceramic honeycomb are alternately sealed, a felt-like filter in which inorganic fibers such as alumina are laminated at random, or the like. A catalyst such as platinum, cerium oxide is carried on this filter.

If the monolith-honeycomb wall-flow type filter is employed for the filter device 12b with catalyst, PM (particulate matter) in an exhaust gas G is collected (trapped) by a porous ceramic wall. If the fiber-type filter is employed, the PM is collected by the inorganic fiber in the filter.

In order to estimate an accumulated amount of the PM in the filter device 12b with catalyst, a differential pressure sensor 21 is provided in a conduit connected to the front and the rear of the exhaust gas purification device 12. Moreover, an oxidation-catalyst inlet exhaust-temperature sensor 22 is provided on the upstream side of the oxidation catalyst device 12a and a filter inlet exhaust-temperature sensor 23 between the oxidation catalyst device 12a and the filter device 12b with catalyst, respectively, for regeneration control of the filter device 12b with catalyst.

This oxidation-catalyst inlet exhaust-temperature sensor 22 detects a first exhaust gas temperature Tg1, which is a temperature of the exhaust gas flowing into the oxidation catalyst device 12a. The filter inlet exhaust-temperature sensor 23 detects a second exhaust gas temperature Tg2, which is a temperature of the exhaust gas flowing into the filter device 12b with catalyst.

Moreover, in an intake passage 14, an air cleaner 15, an MAF sensor (intake air amount sensor) 19, an intake throttle valve (intake throttle) 16, an intake temperature sensor 29 for detecting an intake temperature Ta, and the like are provided. The intake throttle valve 16 adjusts an amount of an intake A into an intake manifold.

Output values from these sensors are inputted to a controller (ECU: Engine Control Unit) 30 for regeneration control of the exhaust gas purification device 12 as well as general control of operation of the engine 10. By a control signal outputted from the controller 30, the intake throttle valve 16, a fuel injection device (injection nozzle) 17, the exhaust brake valve 18, the exhaust throttle valve 13, an EGR valve, and the like are controlled. The EGR valve is provided at an EGR passage, not shown, with an EGR cooler for adjusting an EGR amount.

The fuel injection device 17 is connected to a common-rail injection system (not shown) temporarily storing a high-pressure fuel whose pressure has been raised by a fuel pump (not shown). Into the controller 30, information such as a vehicle speed, cooling water temperature in addition to information such as acceleration opening from an accelerator position sensor (APS) 24, engine speed from an engine speed sensor 25 are inputted for operation of the engine. An energizing time signal is outputted from the controller 30 so that a predetermined amount of fuel is injected from the fuel injection device 17.

A flashing lamp (DPF lamp) 26 as a warning means for drawing attention, an alarm lamp 27 lighted at abnormality, and a manual regeneration button (manual regeneration switch) 28 are provided not only so that forced regeneration is carried out automatically during running, but so that an operator (driver) arbitrarily stops a vehicle and carries out forced regeneration in the regeneration control of the exhaust gas purification device 12. If a collected amount of PM in the filter device 12b with catalyst exceeds a certain amount and the filter device 12b with catalyst is clogged, attention of the operator (driver) is attracted by these means.

In the control of the exhaust gas purification system 1, PM is collected in normal operation. In this normal operation, whether it is regeneration timing or not is monitored. If it is determined as regeneration timing, an alarm is given or automatic regeneration during running is carried out. In the case of the alarm, the driver who has received the alarm operates the manual regeneration button 28 so as to carry out manual regeneration.

Figure 2:
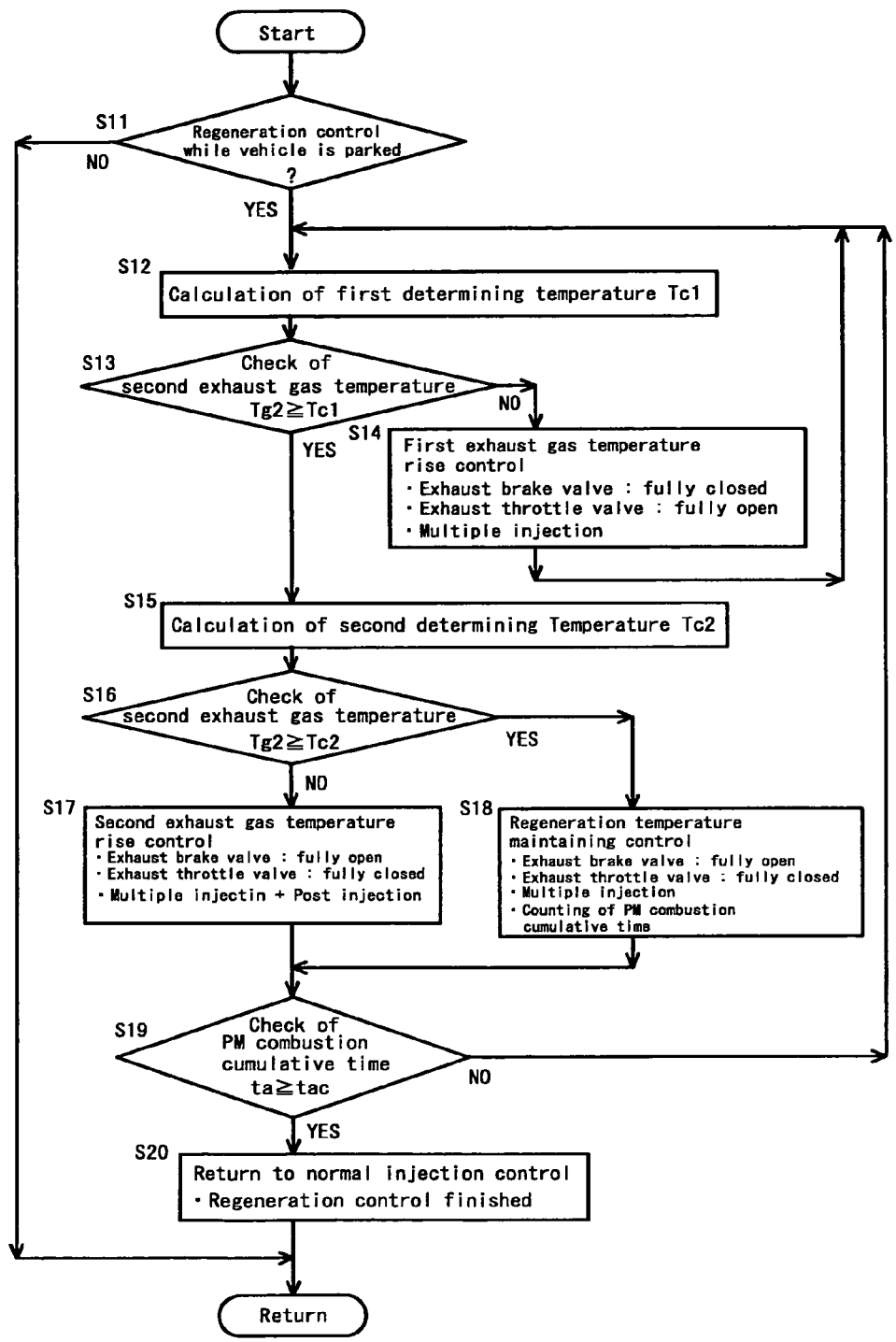
FIG. 2 is a flow chart showing an example of a regeneration control while a vehicle is parked.
Figure 3:
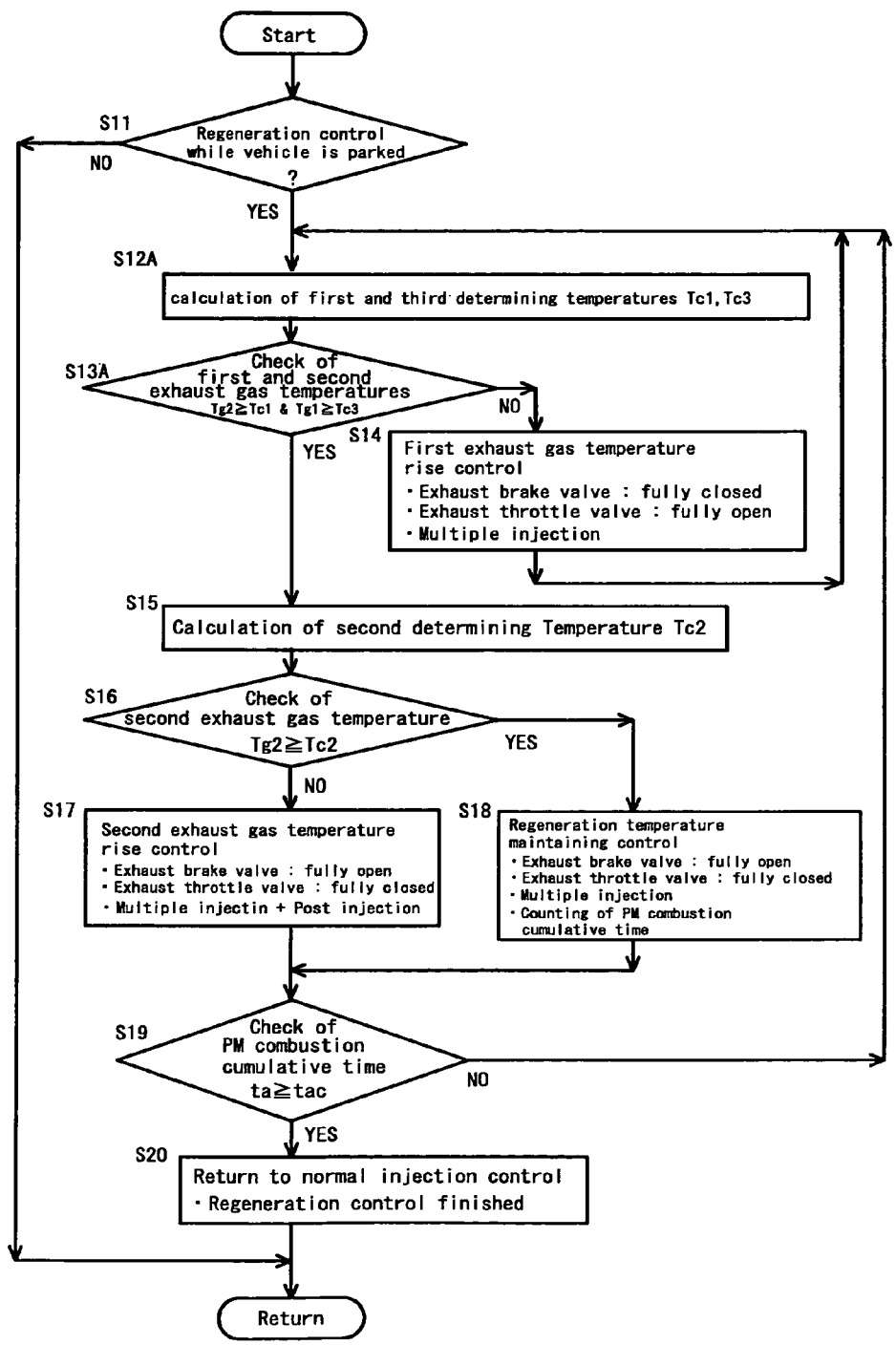
FIG. 3 is a flow chart showing another example of a regeneration control while a vehicle is parked.

The forced regeneration of the manual regeneration and the automatic regeneration during running are carried out according to a control flow as exemplified in FIG. 2 or FIG. 3 in this embodiment. In FIG. 2, as a catalyst temperature index temperature indicating a temperature of the oxidation catalyst (bed temperature), the second exhaust gas temperature Tg2 detected by the filter inlet exhaust-temperature sensor 23 is used. When the second exhaust gas temperature Tg2 becomes equal to a predetermined first determining temperature Tc1 or above, an unburned fuel is supplied to the upstream side of the oxidation catalyst device 12a by the post injection. As a filter temperature index temperature indicating a temperature of the filter device 12b with catalyst, the second exhaust gas temperature Tg2 detected by the filter inlet exhaust-temperature sensor 23 is also used. When the second exhaust gas temperature Tg2 becomes equal to a predetermined second determining temperature Tc2 or above, the regeneration temperature maintaining control is conducted by the multiple injection without the post injection.

When the control flow in FIG. 2 is started, it is determined at Step S11 if it is the regeneration control while the vehicle is parked or not, and if it is not the regeneration control while the vehicle is parked, the routine returns without conducting the regeneration control and the normal operation control or the automatic regeneration control during running is conducted. If it is the regeneration control while the vehicle is parked at Step S11, the routine goes to Step S12.

The regeneration control while the vehicle is parked is conducted in the following cases. In the manual regeneration, the regeneration control while the vehicle is parked is started when the driver, who is prompted for the manual regeneration, stops the vehicle and operates the manual regeneration button 28. In the case of the automatic regeneration during running, when it is detected from a detected value of the differential pressure sensor 21 or the like that the collected amount of PM in the filter device 12b with catalyst exceeds a certain amount, the regeneration control is conducted, and if the vehicle is stopped during the regeneration control, the regeneration control while the vehicle is parked is conducted. The regeneration control while the vehicle is parked is not conducted till the vehicle is stopped and after the running is started.

At Step S12, the first determining temperature Tc1 is calculated. The first determining temperature Tc1 is a temperature (approximately 200 to 250° C., for example) that if the second exhaust gas temperature (catalyst temperature index temperature) Tg2 becomes equal to the temperature, HC is sufficiently oxidized by the oxidation catalyst of the oxidation catalyst device 12a. The second exhaust gas temperature Tg2 is an exhaust gas temperature detected by the filter inlet exhaust-temperature sensor 23. The HC is the unburned fuel supplied by the post injection. As the first determining temperature Tc1, a value changed according to an engine speed Ne at that time may be used. Also, instead of the second exhaust gas temperature Tg2 detected by the filter inlet exhaust-temperature sensor 23, the first exhaust gas temperature Tg1 detected by the oxidation-catalyst inlet temperature sensor 22 may be used.

At Step S13, the second exhaust gas temperature (catalyst temperature index temperature) Tg2 is checked. If the second exhaust gas temperature Tg2 is lower than the first determining temperature Tc1 calculated at Step S12, first exhaust gas temperature rise control is conducted at Step S14 for a predetermined time (time relating to an interval of check of the second exhaust gas temperature Tg2 at Step S13) Δt1.

In the first exhaust gas temperature rise control, in order to improve the temperature rise efficiency of the exhaust gas by the exhaust brake valve 18, the exhaust brake valve 18 is set to a fully closed side, the exhaust throttle valve 13 to a fully open side, and the multiple injection is carried out without the post injection. By valve closing of the exhaust brake valve 18, escape of heat is prevented. At the same time, an engine load is increased, and the exhaust gas temperature is raised efficiently in a short time. By this arrangement, the temperature rise property of the oxidation catalyst device 12a is improved.

After the Step S14, the routine returns to Step S12. If in the determination at Step S13, the second exhaust gas temperature Tg2 is equal to the predetermined first determining temperature Tc1 or above, the routine goes to Step S15.

The following configuration is also possible. As the catalyst temperature index temperature indicating the temperature of the oxidation catalyst, both the second exhaust gas temperature Tg2 detected by the filter inlet exhaust-temperature sensor 23 and the first exhaust gas temperature Tg1 detected by the oxidation-catalyst inlet exhaust-temperature sensor 22 are used. As predetermined determining temperatures for the both, respectively, the first determining temperature Tc1 and a third determining temperature Tc3 are used. When the second exhaust gas temperature Tg2 exceeds the first determining temperature Tc1 and the first exhaust gas temperature Tg1 exceeds the third determining temperature Tc3, the unburned fuel is supplied by the post injection to the upstream side of the oxidation catalyst device 12a.

In this case, Step S12 and Step S13 in FIG. 2 are replaced by Step S12A and Step S13A in FIG. 3. At Step S12A, the third determining temperature Tc3 is calculated in addition to the first determining temperature Tc1.

At Step S13A, it is determined if the second exhaust gas temperature Tg2 is equal to the first determining temperature Tc1 or above and if the first exhaust gas temperature Tg1 is equal to the third determining temperature Tc3 or above. Only if the second exhaust gas temperature Tg2 is equal to the first determining temperature Tc1 or above and the first exhaust gas temperature Tg1 is equal to the third determining temperature Tc3 or above, the routine goes to Step S15, while in the other cases, the routine goes to Step S14.

At step S15, the second determining temperature Tc2 is calculated. The second determining temperature Tc2 is a target temperature for the second exhaust gas temperature rise control at Step S17. By maintaining the second exhaust gas temperature (filter temperature index temperature) Tg2, which is a temperature of the exhaust gas detected by the filter inlet exhaust-temperature sensor 23 at this temperature Tc2 or above, combustion of the PM collected by the filter device 12b with catalyst is maintained in a favorable state. The second determining temperature Tc2 is usually set at a value higher than a combustion start temperature of the PM (approximately 350° C., for example), at approximately 500° C., for example. It may be changed in many stages according to time.

At the subsequent Step S16, the second exhaust gas temperature (filter temperature index temperature) Tg2 is checked. If the second exhaust gas temperature Tg2 is lower than the second determining temperature Tc2, the routine goes to the second exhaust gas temperature rise control at Step S17, while if the second exhaust gas temperature Tg2 is equal to the second determining temperature Tc2 or above, the routine goes to regeneration temperature maintaining control at Step S18.

At Step S17, the second exhaust gas temperature rise control is conducted for a predetermined time (time relating to an interval of check of the second exhaust gas temperature Tg2 at Step S16) Δt2. In the second exhaust gas temperature rise control, in order to improve the temperature rise efficiency of the exhaust gas by the exhaust throttle valve 13, the exhaust brake valve 18 is set to the fully open side, the exhaust throttle valve 13 is set to the fully closed side, and the post injection is carried out in addition to the multiple injection. By valve closing of the exhaust throttle valve 13, the passage area is widened than in the case of the fully closed of the exhaust brake valve 18. Thus, since the engine load is alleviated, rise of the in-cylinder temperature is reduced, and the post injection is enabled.

The temperature rise of the exhaust gas is continued by the multiple injection, the unburned fuel (HC) is supplied into the exhaust gas by the post injection, and the unburned fuel is oxidized by the oxidation catalyst device 12a. Through the resulting oxidation heat, the temperature of the exhaust gas can be further raised. When the raised temperature Tg2 of the exhaust gas becomes equal to the second determining temperature Tc2 or above, PM collected by the filter device 12b with catalyst is burned. In the second exhaust gas temperature rise control, the second exhaust gas temperature Tg2 may be continuously raised to the control target temperature Tc2, but the temperature may be raised in two stages or many stages. After the Step S17, the routine goes to Step S19.

If it is determined at Step S16 that the second exhaust gas temperature Tg2 is equal to the second determining temperature Tc2 or above, the regeneration temperature maintaining control in the in-cylinder (in the cylinder) injection of the engine 10 is conducted for a predetermined time (time relating to an interval of duration time check of the second exhaust gas temperature Tg2 at Step S16) Δt3 at Step S18. In this regeneration temperature maintaining control, the temperature rise of the exhaust gas is continued by continuation of the multiple injection. By stopping the post injection, supply of the unburned fuel into the exhaust gas is stopped. By this arrangement, the temperature rise is restricted so that the temperature Tg2 of the exhaust gas flowing into the filter device 12b with catalyst does not become too high. By this restriction of the temperature rise of the exhaust gas temperature, the abnormal combustion in the filter device 12b with catalyst can be prevented.

At Step S18, PM combustion cumulative time is counted. In this count, only if the second exhaust gas temperature Tg2 is equal to the predetermined second determining temperature Tc2 or above, the PM combustion cumulative time ta is counted (ta=ta+Δt3). After the Step S18, the routine goes to Step S19.

At Step S19, in order to determine if the regeneration control is to be finished or not, the PM combustion cumulative time ta is checked. In this check, it is checked if the PM combustion cumulative time ta exceeds a predetermined determining time Tac or not. That is, if it is exceeded, the regeneration control is determined to be completed, and the routine goes to Step S20, while if not exceeded, the regeneration control is determined not to be completed, and the routine returns to Step S12. Till the PM combustion cumulative time ta exceeds the predetermined determining time tac, the first exhaust gas temperature rise control at Step S14, the second exhaust gas temperature rise control at Step S17, or the regeneration temperature maintaining control at Step S18 is conducted.

At Step S20, the regeneration control is finished, the exhaust throttle valve 13 and the exhaust brake valve 18 are returned to the normal operation state, and the normal injection control is restored. After that, the routine returns.

During these controls, start of running of the vehicle is monitored all the time, and when running is started, the routine goes to return, the control flow is halted, and predetermined control such as the automatic regeneration control during running and the normal operation control is restored.

By the regeneration control while the vehicle is parked, the following control can be conducted.

At the regeneration control, if the temperature of the exhaust gas flowing into the filter device 12b with catalyst is lower than the predetermined first determining temperature Tc1, the first exhaust gas temperature rise control is conducted so that the second exhaust gas temperature Tg2 can be raised to the predetermined first determining temperature Tc1. The temperature of the exhaust gas flowing into the filter device 12b with catalyst is the second exhaust gas temperature (catalyst temperature index temperature) Tg2, which is the temperature of the exhaust gas detected by the filter inlet exhaust-temperature sensor 23. In the first exhaust gas temperature rise control, the exhaust brake valve 18 is set to the fully closed side, and the multiple injection without the post injection is carried out in the in-cylinder injection control of the engine 10 at the same time.

If the temperature Tg2 of the exhaust gas flowing into the filter device 12b with catalyst is equal to the predetermined first determining temperature Tc1 or above, the second exhaust gas temperature rise control is conducted. In the second exhaust gas temperature rise control, the exhaust brake valve 18 is set to the fully open side, the exhaust throttle valve 13 is set to the fully closed side, and the post injection is carried out in addition to the multiple injection in the in-cylinder fuel injection control. By the second exhaust gas temperature rise control, the temperature (catalyst temperature index temperature, filter temperature index temperature) Tg2 of the exhaust gas flowing into the filter device 12b with catalyst can be raised to the predetermined second determining temperature Tc2.

Moreover, until time during which the temperature (filter temperature index temperature) Tg2 of the exhaust gas flowing into the filter device 12b with catalyst is equal to the predetermined second determining temperature Tc2 or above exceeds the predetermined determining duration tac, the first exhaust gas temperature rise control, the second exhaust gas temperature rise control, and the regeneration temperature maintaining control are conducted so as to regenerate the filter device 12b with catalyst.

Therefore, at the exhaust gas temperature rise in the regeneration control while the vehicle is parked, if the second exhaust gas temperature Tg2 (catalyst temperature index temperature) is lower than the predetermined first determining temperature Tc1, the exhaust brake valve 18 is set to the fully closed side, the exhaust throttle valve 13 is set to the fully open side, and the multiple injection is carried out at the same time, by which the exhaust gas temperature can be raised while the load is increased.

If the second exhaust gas temperature Tg2 (catalyst temperature index temperature) becomes equal to the predetermined first determining temperature Tc1 or above, the exhaust brake valve 18 is fully opened, the exhaust throttle valve 13 is fully closed, and the post injection is carried out in addition to the multiple injection. By this operation, the temperature rise efficiency of the exhaust gas can be enhanced.

As a result, the PM collected by the filter device 12b with catalyst is forcedly burned and removed so as to forcedly regenerate the filter device 12b with catalyst, and forced regeneration can be carried out efficiently, avoiding overheat.

Thus, at the regeneration control while the vehicle is parked, since the control is conducted using both the exhaust throttle valve 13 and the exhaust brake valve 18, if the exhaust gas temperature is low, the temperature rise property is ensured and the temperature rise efficiency of the exhaust gas can be enhanced by using the exhaust brake valve 18. If the exhaust gas temperature becomes high, excessive rise of the exhaust gas temperature can be restricted through using the exhaust throttle valve 13 even if the post injection is carried out. Therefore, forced regeneration can be realized efficiently, avoiding overheat.

In the above embodiment, a combination of the oxidation catalyst device on the upstream side and the filter (DPF) with catalyst on the downstream side was described as an example of the exhaust gas purification device in the exhaust gas purification system, but it may be a filter (DPF) carrying the oxidation catalyst.

Though not described in the control flows in FIG. 2 and FIG. 3 in order to avoid complexity, the following configuration is possible. The second exhaust gas temperature (filter temperature index temperature) Tg2 is monitored all the time, and if the second exhaust gas temperature Tg2 exceeds a predetermined determining value (fourth determining temperature Tc4) higher than the second determining value Tc2 at Step S18, the post injection or the like may be stopped and only the multiple injection may be carried out. By this arrangement, abnormal combustion of PM in the filter 12b with catalyst is avoided.

INDUSTRIAL APPLICABILITY

The control method of the exhaust gas purification system and the exhaust gas purification system of the present invention having the above-mentioned excellent advantages can be used extremely effectively in an exhaust gas purification system provided on an internal combustion engine or the like mounted on an automobile and provided with an exhaust gas purification device having an oxidation catalyst device carrying an oxidation catalyst and a diesel particulate filter device arranged in order from an upstream side or an exhaust gas purification device having a diesel particulate filter device carrying an oxidation catalyst arranged, an index temperature detecting means for detecting a catalyst temperature index temperature indicating a temperature of the oxidation catalyst, an exhaust throttle valve, and an exhaust brake valve in an exhaust passage of the internal combustion engine, and provided with a controller for regeneration control based on a detection result of the index temperature detecting means in order to recover purification capacity of the diesel particulate filter device.

What is claimed is:

1. A control method of an exhaust gas purification system having an exhaust gas purification device with an oxidation catalyst device carrying an oxidation catalyst and a diesel particulate filter device arranged in order from an upstream side, or an exhaust gas purification device having a diesel particulate filter device carrying an oxidation catalyst arranged, an index temperature detector for detecting a catalyst temperature index temperature indicating a temperature of the oxidation catalyst, an exhaust throttle valve, an exhaust brake valve in an exhaust passage of an internal combustion engine, and a controller for conducting regeneration control based on a detection result of the index temperature detector in order to recover purification capacity of the diesel particulate filter device,
   wherein at the regeneration control, while a vehicle with the internal combustion engine mounted is parked, both the exhaust throttle valve and the exhaust brake valve are used, and
   at the regeneration control, while the vehicle with the internal combustion engine mounted is parked, if the catalyst temperature index temperature is lower than a predetermined first determining temperature, first exhaust gas temperature rise control is conducted where the exhaust brake valve is set to a fully closed side and multiple injection is carried out in in-cylinder fuel injection control, while if the catalyst temperature index temperature is equal to the predetermined first determining temperature or above, second exhaust gas temperature rise control is conducted where the exhaust brake valve is set to an open side, the exhaust throttle valve is set to the fully closed side, and post injection is carried out in the in-cylinder fuel injection control.

2. The control method of the exhaust gas purification system according to claim 1,
   wherein at the regeneration control while the vehicle with the internal combustion engine mounted is parked, if a filter temperature index temperature indicating a temperature of the diesel particulate filter device is higher than a predetermined second determining temperature higher than the predetermined first determining temperature, the exhaust brake valve is set to the open side, the exhaust throttle valve is set to the fully closed side, and regeneration temperature maintaining control is conducted without carrying out the post injection in the in-cylinder fuel injection control.

3. The control method of the exhaust gas purification system according to claims 1 or 2, wherein
   manual regeneration control is included in the regeneration control while the vehicle with the internal combustion engine mounted is parked.

4. An exhaust gas purification system comprising an exhaust gas purification device with an oxidation catalyst device carrying an oxidation catalyst and a diesel particulate filter device arranged in order from an upstream side, or an exhaust gas purification device having a diesel particulate filter device carrying an oxidation catalyst arranged, an index temperature detector for detecting a catalyst temperature index temperature indicating a temperature of the oxidation catalyst, an exhaust throttle valve, an exhaust brake valve in an exhaust passage of an internal combustion engine, and a controller for carrying out regeneration control based on a detection result of the index temperature detector in order to recover purification capacity of the diesel particulate filter device,
   wherein at the regeneration control, while the vehicle with the internal combustion engine mounted is parked, the controller conducts control using both the exhaust throttle valve and the exhaust brake valve, and
   wherein at the regeneration control, while the vehicle with the internal combustion engine mounted is parked, if the catalyst temperature index temperature is lower than a predetermined first determining temperature, the controller conducts first exhaust gas temperature rise control where the exhaust brake valve is set to a fully closed side and multiple injection is carried out in in-cylinder fuel injection control, while if the catalyst temperature index temperature is equal to the predetermined first determining temperature or above, the controller conducts second exhaust gas temperature rise control where the exhaust brake valve is set to an open side, the exhaust throttle valve is set to the fully closed side, and post injection is carried out in the in-cylinder fuel injection control.

5. The exhaust gas purification system according to claim 4, wherein
   at the regeneration control, while the vehicle with the internal combustion engine mounted is parked, if a filter temperature index temperature indicating a temperature of the diesel particulate filter device is higher than a predetermined second determining temperature higher than the predetermined first determining temperature, the controller sets the exhaust brake valve to the open side, the exhaust throttle valve to the fully closed side, and conducts regeneration temperature maintaining control without carrying out the post injection in the in-cylinder fuel injection control.

6. The exhaust gas purification system according to claims 4 or 5, wherein
   manual regeneration control is included in the regeneration control while the vehicle with the internal combustion engine mounted is parked.

* * * * *